(12) United States Patent
Matsuno

(10) Patent No.: US 9,227,663 B2
(45) Date of Patent: Jan. 5, 2016

(54) DRIVING ASSIST CONTROLLER FOR VEHICLE

(71) Applicant: Fuji Jukogyo Kabushiki Kaisha, Tokyo (JP)

(72) Inventor: Koji Matsuno, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/307,398

(22) Filed: Jun. 17, 2014

(65) Prior Publication Data

US 2015/0012179 A1    Jan. 8, 2015

(30) Foreign Application Priority Data

Jul. 4, 2013   (JP) ................. 2013-140820

(51) Int. Cl.
| | |
|---|---|
| *B62D 1/28* | (2006.01) |
| *B62D 15/00* | (2006.01) |
| *B62D 15/02* | (2006.01) |
| *G05D 1/02* | (2006.01) |

(52) U.S. Cl.
CPC ............... *B62D 15/025* (2013.01); *B62D 1/28* (2013.01); *B62D 15/00* (2013.01); *B62D 15/029* (2013.01); *G05D 1/021* (2013.01)

(58) Field of Classification Search
CPC ..... G05D 1/00; G05D 1/0212; G05D 1/0231; G05D 1/0236; G05D 1/0244; G05D 1/0246; G05D 1/0253; G05D 1/0257; G05D 1/0268; G05D 1/0289; G05D 3/12; B62D 5/0457; B62D 6/00

USPC .............. 701/23, 28, 36–44, 70, 93–98, 116, 701/300–302
See application file for complete search history.

(56) References Cited

U.S. PATENT DOCUMENTS

| 7,413,267 | B2 * | 8/2008 | Katayama ...................... 303/165 |
|---|---|---|---|
| 8,078,373 | B2 * | 12/2011 | Deng et al. ...................... 701/65 |
| 2005/0275284 | A1 * | 12/2005 | Katayama ...................... 303/146 |
| 2007/0233343 | A1 * | 10/2007 | Saito et al. ...................... 701/41 |
| 2008/0278349 | A1 * | 11/2008 | Kataoka et al. ............... 340/933 |
| 2010/0023218 | A1 * | 1/2010 | Hayakawa et al. ............. 701/42 |
| 2010/0131142 | A1 * | 5/2010 | Deng et al. ...................... 701/29 |
| 2012/0277957 | A1 * | 11/2012 | Inoue et al. ...................... 701/41 |

FOREIGN PATENT DOCUMENTS

JP           2005-170327 A     6/2005

* cited by examiner

*Primary Examiner* — Thomas Tarcza
*Assistant Examiner* — Tyler J Lee
(74) *Attorney, Agent, or Firm* — McGinn IP Law Group PLLC

(57) ABSTRACT

Feed-forward control amounts of an electric motor, which are necessary for a vehicle to travel along the target course under the feed-forward control, are calculated on the basis of the road shape. The prediction time is variably set to be shorter as the present displacement between the target course and the vehicle position becomes larger, the position after elapse of the prediction time is defined as a forward gaze point, and the feedback control amounts of the electric motor, which are necessary for the vehicle to travel along the target course under the feedback control, are calculated on the basis of the traveling state of the vehicle so as to zero the displacement between the target course and the vehicle trajectory in the forward gaze point. The electric motor current value is then calculated from the driver steering torque, feed-forward control amounts, and feedback control amounts.

18 Claims, 8 Drawing Sheets

DRIVING ASSIST CONTROLLER FOR VEHICLE

CROSS-REFERENCE TO RELATED APPLICATIONS

The present application claims priority from Japanese Patent Application No. 2013-140820 filed on Jul. 4, 2013, the entire contents of which are hereby incorporated by reference.

BACKGROUND

1. Technical Field

The present invention relates to a driving assist controller for a vehicle that operates an electric power steering motor to enable the vehicle to travel along a set target course.

2. Related Art

Various driving assist controllers for a vehicle that assist driving to enable the vehicle to run along a set target course have recently been developed with the object of decreasing the number of traffic accidents and reduce a load on a driver. A forward gaze point model simulating the driver's operations has been widely known as a technique for calculating a target steering angle for causing the vehicle to run along the target course. For example, Japanese Unexamined Patent Application Publication (JP-A) No. 2005-170327 discloses an automatic steering control device for a vehicle in which a forward gaze point that is set in front of a vehicle equipped the device is set farther from the vehicle when the vehicle speed increases, and a steering amount is calculated on the basis of a difference between the forward gaze point and a reference path constituting the running target path. In this automatic steering control device, the difference based on the forward gaze point that has been set on the curve ahead is corrected to be brought closer to the difference based on the forward gaze point that is set when the vehicle enters the curve.

However, when the target steering angle is set according to the transverse deviation from the target course in the forward gaze point, such as disclosed in JP-A No. 2005-170327, where a distance from the present vehicle position to the forward gaze point is small, or a prediction time (time till the vehicle reaches the forward gaze point) is short, the proximity of the vehicle is viewed, the operation allowing the vehicle to track rapidly the target course is performed, and the target course tracking ability is improved, but nervous and unstable target steering angle or vehicle behavior, which is focused only on the present transverse deviation, is realized. Meanwhile, where the prediction time is extended, the operation that may return the vehicle to the target course after the prediction time is performed and the target course tracking ability is slowed down, but the prediction control is performed that takes into account not only the transverse deviation from the target course, but also the orientation of the vehicle with respect to the target course, and the change ratio thereof (yaw rate), and stable target steering angle and vehicle behavior are obtained. It follows from the above, that when the driving assist control is executed with the forward gaze point model, the prediction time should be adequately set such as to balance the rapid target course tracking ability with the stability of vehicle behavior. Setting the forward gaze point according to the vehicle speed, as disclosed in JP-A No. 2005-170327, is equivalent to maintaining the prediction time. The resultant problem is that although the vehicle behavior is stabilized according to the increase in vehicle speed, the ability to track the target course at a high speed is slowed down. Further, a function of changing the forward gaze point according to the road radius ahead is also disclosed as a measure alleviating the concern that when the vehicle enters a curve, the forward gaze point becomes too far on the curve and the control that takes no account of the subsequent deceleration operation is performed. However, this is merely the correction assuming the vehicle speed at the time when the vehicle enters the curve, and basically equivalent to setting the distance to the forward gaze point that is sensitive to the vehicle speed.

SUMMARY OF THE INVENTION

With the foregoing in view, it is an object of the present invention to provide a driving assist controller for a vehicle that can effectively balance the rapid target course tracking ability with the stability of vehicle behavior on the target course.

An aspect of the present invention provides a driving assist controller for a vehicle including: a target course setting unit that sets a target course along which a vehicle equipped the driving assist controller is to travel; a vehicle trajectory estimation unit that estimates a trajectory of the vehicle; a forward gaze point calculation unit that calculates a position after elapse of a prediction time, which is variably set according to a substantially present displacement between the target course and the vehicle position, as a forward gaze point; and a control unit that controls the vehicle such that the vehicle travels along the target course in response at least to a displacement between the target course in the forward gaze point and the estimated trajectory of the vehicle.

BRIEF DESCRIPTION OF THE DRAWINGS

FIGS. 9A and 9B are explanatory drawings illustrating the effect of lane keep control performed based on the set prediction time according to the implementation of the present invention, wherein FIG. 9A illustrates the position relating to the target course, and FIG. 9B illustrates the target steering angle that is set by the control.

DETAILED DESCRIPTION

Implementation of the present invention will be described below with reference to the appended drawings.

In the implementation of the present invention, the so-called lane keep control using an electric power steering motor is explained as an example of driving assist control for a vehicle.

Figure 1:
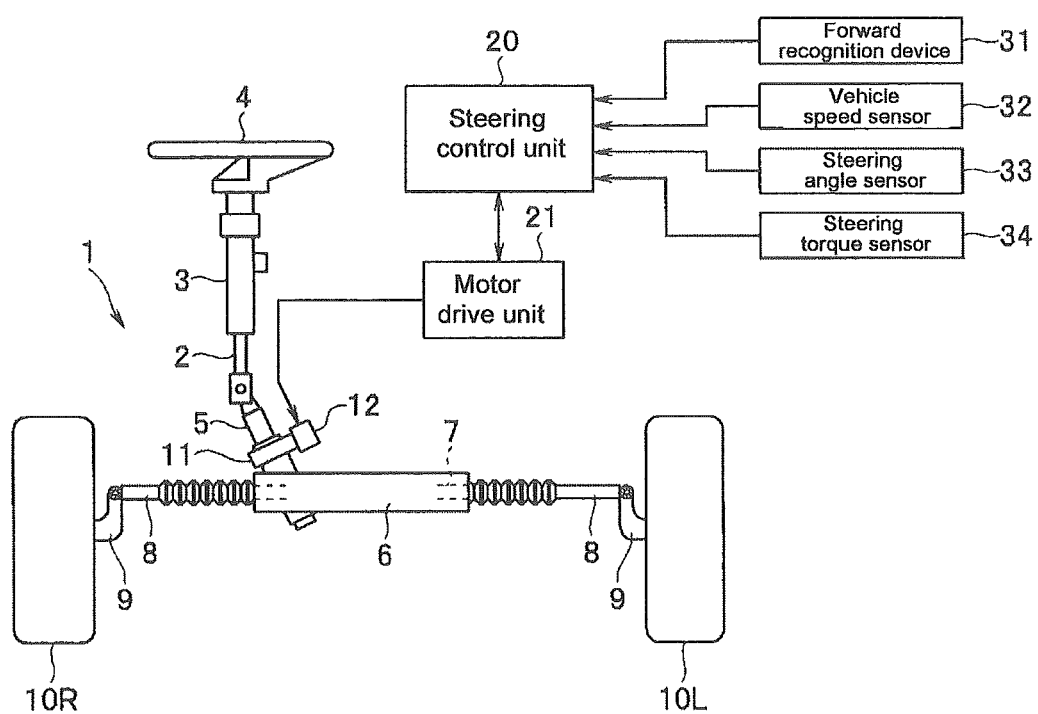
FIG. 1 is a an explanatory drawing illustrating the configuration of the steering system of a vehicle according to one implementation of the present invention.

In FIG. 1, the reference numeral 1 stands for an electric power steering device that can set a steering angle independently from the driver's input. In the electric power steering device 1, a steering shaft 2 is rotatably supported by a steering column 3 on a vehicle body frame (not illustrated in the figure), one end thereof extends toward a driver seat, and the other end extends toward an engine room. A steering wheel 4 is fixedly attached to the end of the steering shaft 2 on the driver seat side, and a pinion shaft 5 is coupled to the end of the steering shaft 2 on the side extending toward the engine room.

A steering gear box 6 extending in the vehicle width direction is, provided in the engine room, and a rack shaft 7 is inserted and supported to move reciprocatingly in the steering gear box 6. A pinion formed at the pinion shaft 5 is meshed with a rack (not illustrated in the figure) formed at the rack shaft 7, thereby forming a steering gear mechanism of a rack-and-pinion type.

The left and right end portions of the rack shaft 7 protrude from the respective ends of the steering gear box 6, and a front knuckle 9 is coupled via a tie rod 8 to the end portion. The front knuckles 9 rotatably support left and right wheels 10L, 10R as steered wheels and are turnably supported on the vehicle body frame. Therefore, where the steering wheel 4 is operated and the steering shaft 2 and the pinion shaft 5 are rotated, the rack shaft 7 is moved to the left or to the right by the rotation of the pinion shaft 5, this movement causes the front knuckle 9 to rotate about the king pin shaft (not illustrated in the figure), and the left and right wheels 10L, 10R are turned to the left or to the right.

An electric power steering motor (electric motor) 12 is coupled via an assist transmission mechanism 11 to the pinion shaft 5, and the electric motor 12 provides assistance to a steering torque to be applied to the steering wheel 4 and adds a steering torque so as to obtain a preset steering angle (target steering angle). The electric motor 12 is driven by a motor drive unit 21 when a target current Icmd serving as a control output value is outputted from the below-described steering control unit 20 to the motor drive unit 21. The steering control unit 20 also has a steering torque assist function, but in the present implementation, the explanation of the steering torque assist function is omitted.

A forward recognition device 31, which recognizes a travel road shape by recognizing left and right lane lines in front of the vehicle as the shape of a road and acquiring lane line position information, is connected with the steering control unit 20. A vehicle speed sensor 32 that detects a vehicle speed V, a steering angle sensor 33 that detects a steering angle $\theta_p$, and a steering torque sensor 34 that detects a steering torque Td are also connected with the steering control unit.

The forward recognition device 31 is constituted, for example, by a set of CCD cameras that are attached at predetermined intervals on the front side of the ceiling inside the vehicle cabin and capture the stereo image of objects outside the vehicle from different viewpoints, and a stereo image processing device that processes image data from the CCD cameras.

The processing of image data from the CCD cameras in the stereo image processing device of the forward recognition device 31 is performed, for example, in the following manner. Initially, distance information is determined from a displacement amount of corresponding positions with respect to a pair of stereo images in the vehicle advance direction that have been captured by the CCD cameras, and a distance image is generated.

Figure 4:
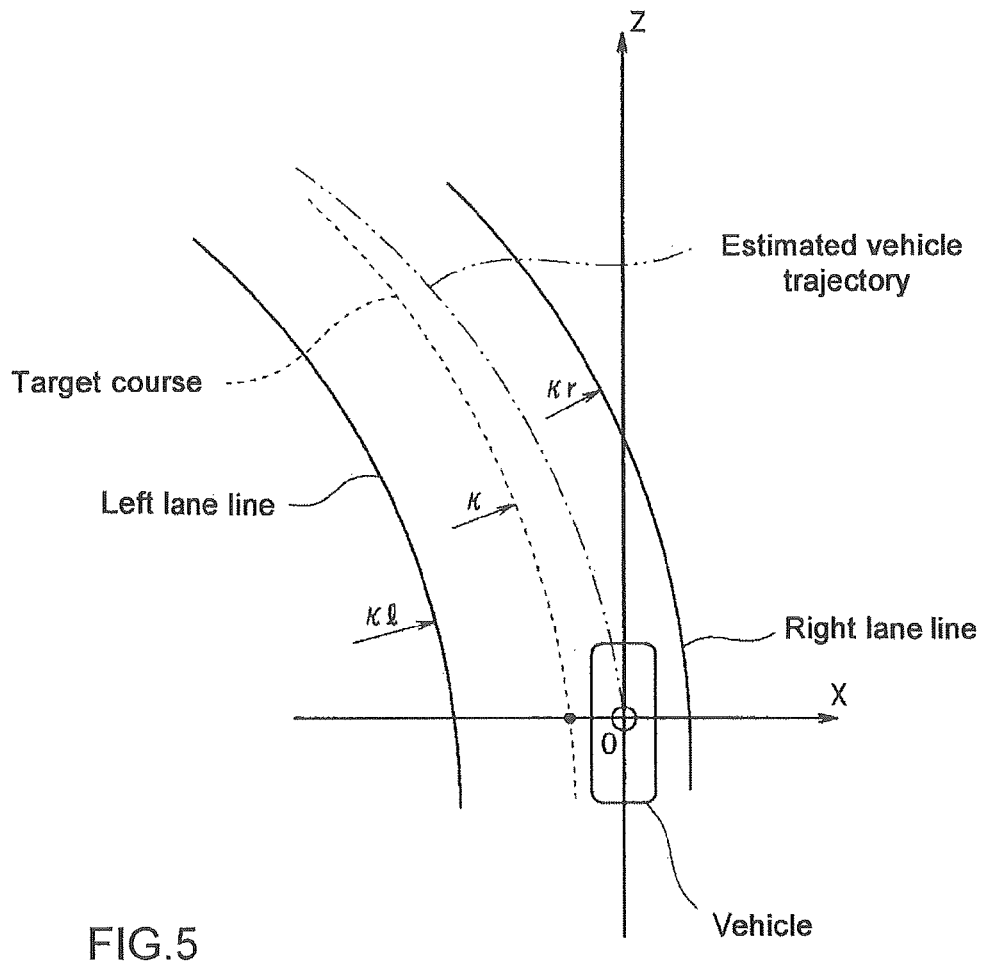
FIG. 4 is an explanatory drawing illustrating the system coordinate, lane lines, and the curvature of the target course according to the implementation of the present invention.

In recognition of lane line data, a change in brightness in the width direction of the road is estimated on the basis of the fact that the lane line is brighter than the road surface, and the positions of the left and right lane lines on the image plane are specified on the image plane. The position (x, y, z) of the lane line in the real space is calculated by the well-known coordinate conversion formula on the basis of the position (i, j) on the image plane and the parallax calculated in relation to this position, that is, on the basis of distance information. The coordinate system of the real space that has been set with reference to the position of the vehicle uses, for example, the road surface immediately below the center of the stereo camera as a point of origin, the vehicle width direction as an x axis, the vehicle height direction as an y axis, and the vehicle length direction (distance direction) as a z axis, as illustrated in FIG. 4. In this case, the x-z plane (y=0) coincides with the road surface when the road is flat. A road model is represented by dividing a vehicle travel lane on the road into a plurality of sectors, and connecting the left and right lane lines in each sector with a predetermined approximation. In the present implementation, an example is explained in which the travel road shape is recognized on the basis of the image from a set of CCD cameras, but the travel road shape may be also determined on the basis of image information from a monocular camera and color camera.

Then, the steering control unit 20 calculates, on the basis of the above-mentioned input signals, the feed-forward control amounts Iff and Tff of the electric motor 12 which are necessary for the vehicle to travel along the target course (in the present implementation, between the left lane line and right lane line) under feed-forward control on the basis of the travel road shape. The steering control unit then variably sets the prediction time T according to a substantially present displacement between the target course and the vehicle position, takes the position after the prediction time T has elapsed as a forward gaze point, and calculates the feedback control amounts Ifb and Tfb of the electric motor 12 which are necessary for the vehicle to travel along the target course under the feedback control on the basis of the travel state of the vehicle, so as to zero the displacement between the target course in the forward gaze point and the trajectory of the vehicle. An input torque Tin is then calculated as a control input value on the basis of the operation torque Td inputted by the driver, the feed-forward control amount Tff, and the feedback control amount Tfb, the electric motor current value Icmd is calculated as a control output value from the electric motor basic current value Ipsb, which is obtained on the basis of the input torque Tin, and also the feed-forward control amount Iff and the feedback control amount Ifb, the calculated electric motor current value is outputted to the motor drive unit 21, and the electric motor 12 is drive-controlled.

Figure 2:
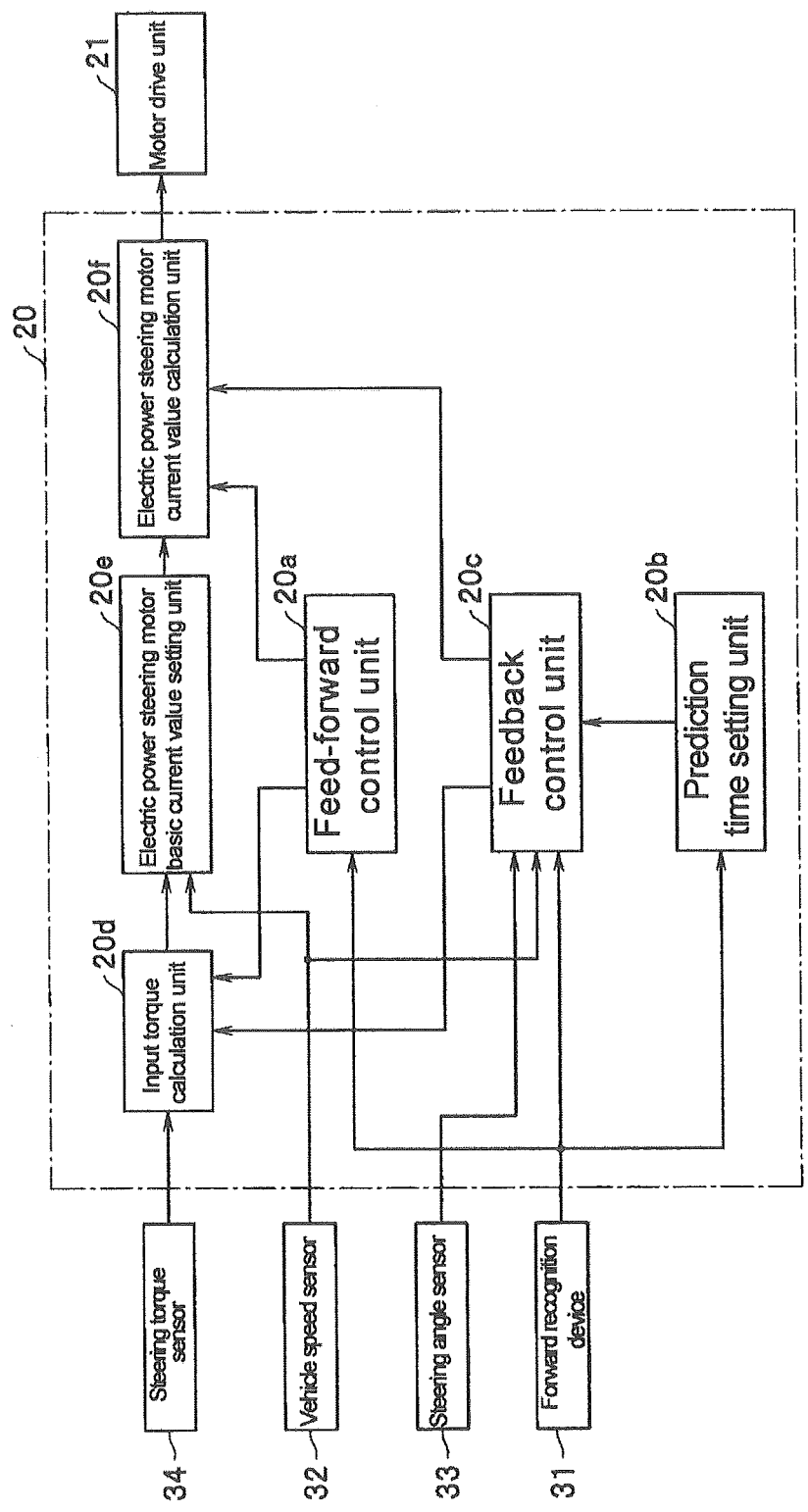
FIG. 2 illustrates the functional block diagram of a steering control unit according to the implementation of the present invention.

To realize such a process, the steering control unit 20 is constituted, as illustrated in FIG. 2, mainly by a feed-forward control unit 20a, a prediction time setting unit 20b, a feedback control unit 20c, an input torque calculation unit 20d, an electric power steering motor basic value setting unit 20e, and an electric power steering motor current value calculation unit 20f.

The feed-forward control unit 20a receives input of the recognized image information from the forward recognition device 31. Then, the feed-forward control amount (current value) Iff of the electric motor 12, which is necessary for the vehicle to travel along the target course, is calculated, for example, by Eq. (1) below, and the feed-forward control amount (torque value) Tff is calculated by Eq. (2) below.

$$Iff = Giff \cdot \kappa \quad (1)$$

$$Tff = Gtff \cdot Iff \quad (2)$$

Here, $\kappa$ is a vehicle line curvature, for example, such as represented by Eq. (3) below.

$$\kappa = (\kappa_1 + \kappa_r)/2 \quad (3)$$

where $\kappa_1$ is a curvature component related to the left lane line, and $\kappa_r$ is a curvature component related to the right lane line. More specifically, the curvature components $\kappa_1$, $\kappa_r$ of the left and right lane lines are determined using a second-order coefficient calculated by a second-order least square method with respect to the points constituting the left and right lane lines, such as illustrated in FIG. 4. For example, when the lane line is approximated by the second-order equation $x = A \cdot z^2 + B \cdot z + c$, the value of $2 \cdot A$ is used as the curvature component. The curvature components $\kappa_1$, $\kappa_r$ of the lane lines may themselves be the curvatures of the respective lane lines.

Giff in Eq. (1) represents a preset feed-forward gain, and Gtff in Eq. (2) is a preset torque recalculation factor.

The feed-forward control amount (torque value) Tff that has thus been calculated by the feed-forward control unit 20a is outputted to the input torque calculation unit 20d, and the feed-forward control amount (current value) Iff is outputted to the electric power steering motor current value calculation unit 20f.

The prediction time setting unit 20b receives input of the recognized image information from the forward recognition device 31. Then, a substantially present displacement xi between the target course and the vehicle position is determined as illustrated in FIG. 6, and the prediction time T is set with reference to a property map, such as illustrated in FIG. 5, which has been set in advance by tests or calculations, on the basis of the absolute value |xi| of this displacement.

Figure 5:
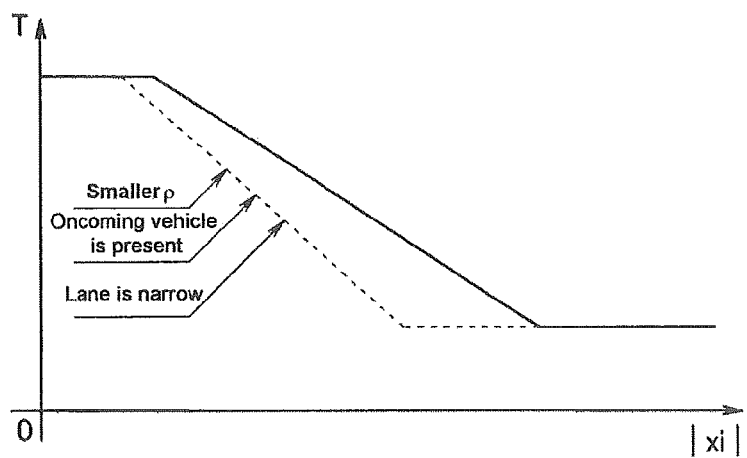
FIG. 5 is an explanatory drawing illustrating an example of the characteristic of the prediction time that is set according to a substantially present deviation between the target course and the vehicle position according to the implementation of the present invention.
Figure 6:
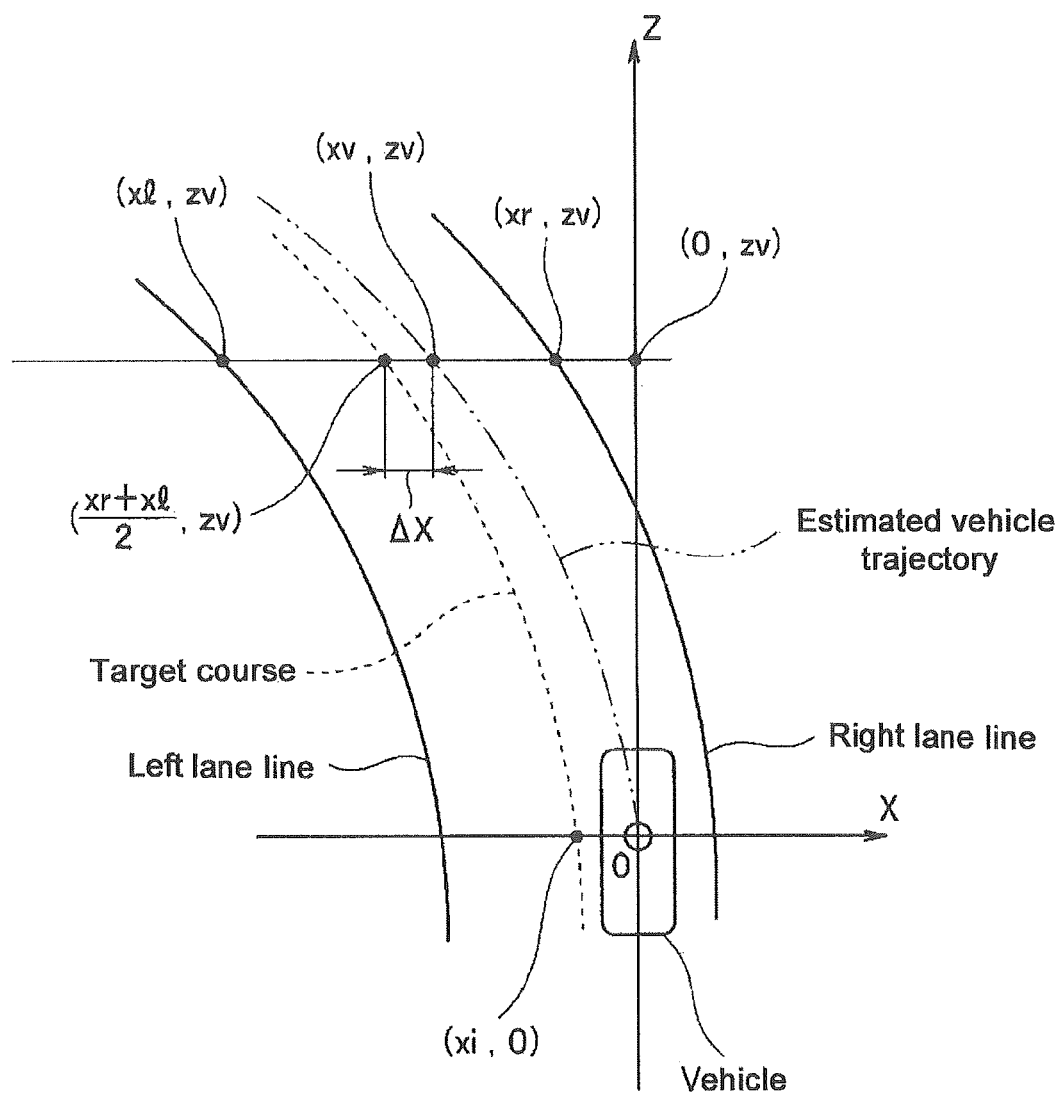
FIG. 6 is an explanatory drawing illustrating the feedback calculation term based on the curvature according to the implementation of the present invention.

The property of the prediction time T is such that a shorter time is set for a larger absolute value |xi| of the substantially present displacement between the target course and the vehicle position, as illustrated in FIG. 5. In such a case, as mentioned hereinabove, where the distance from the present vehicle position to the forward gaze point is small, or the prediction time T is short, the proximity of the vehicle is viewed, the operation allowing the vehicle to track rapidly the target course is performed, and the target course tracking ability is improved, but nervous and unstable target steering angle or vehicle behavior focused only on the present transverse deviation is realized. Meanwhile, where the prediction time is extended, the operation that may return the vehicle to the target course after the prediction time is performed and the target course tracking ability is slowed down, but the prediction control is performed that takes into account not only the transverse deviation from the target course, but also the orientation of the vehicle with respect to the target course, and the change ratio thereof (yaw rate), and stable target steering angle and vehicle behavior are obtained. Therefore, where the absolute value |xi| of the substantially present displacement between the target course and the vehicle position is large, the control prioritizing the target course tracking ability is performed, and when the absolute value |xi| of the displacement is small, the prediction control emphasizing the stability and convergence and taking into account also the orientation of the vehicle with respect to the target course and the change ratio thereof (yaw rate) can be performed. For the same reason, when the curve radius $\rho$ of the road is small, or when an oncoming vehicle is present, or when traveling on a road with narrow lanes, the prediction time T may be corrected to a smaller value to emphasize the target course tracking ability. The prediction time T that has thus been set is outputted to the feedback control unit 20c.

The feedback control unit 20c receives input of the recognized image information from the forward recognition device 31, the vehicle speed V from the vehicle speed sensor 32, the steering angle $\theta p$ from the steering angle sensor 33, and the prediction time T from the prediction time setting unit 20b. Then, the feedback control amount (control current) Ifb of the electric motor 12 necessary for the vehicle to travel along the target course is calculated, for example, by Eq. (4) below, and the feedback control amount (torque value) Tfb is calculated by Eq. (5) below.

$$Ifb = Gifbd \cdot \Delta x + Gfbs \cdot \theta \quad (4)$$

$$Tfb = Gtfb \cdot Ifb \quad (5)$$

Here, Gifbd of the first calculation term [Gifbd·Δx] in Eq. (4) is the feedback gain in the lane width direction, and $\Delta x$ is calculated by Eq. (6) below.

$$\Delta x = (x_1 + x_r)/2 - x_v \quad (6)$$

In Eq. (6), xv is the x coordinate in the z coordinate of the forward gaze point of the vehicle. In the present implementation, as illustrated in FIG. 6, the z-coordinate zv in the forward gaze point is calculated, for example, as $zv = V \cdot T$.

Therefore, the x-coordinate xv of the forward gaze point can be calculated, for example, by Eq. (7) below by using vehicle specifications or a stability factor As inherent to the vehicle on the basis of the traveling state of the vehicle.

$$xv = (1/2) \cdot (1/(1 + As \cdot V^2)) \cdot (\theta p/Lw) \cdot (V \cdot T)^2 \quad (7)$$

where Lw is a wheelbase.

Further, x1 in Eq. (6) is the x coordinate of the left lane line in the z coordinate of the forward gaze point, and xr is the x coordinate of the right lane line in the z coordinate of the forward gaze point. Therefore, the first calculation term in Eq. (4) becomes the calculation term of the x-coordinate difference between the forward gaze point and the central point (target course) between the left and right lane lines, as illustrated in FIG. 6.

Gfbs in the second calculation term [Gfbs·θ] in Eq. (4) is a yaw angle feedback gain, and $\theta$ is calculated by Eq. (8) below.

$$\theta = (\theta t_1 + \theta t r)/2 \quad (8)$$

Figure 7:
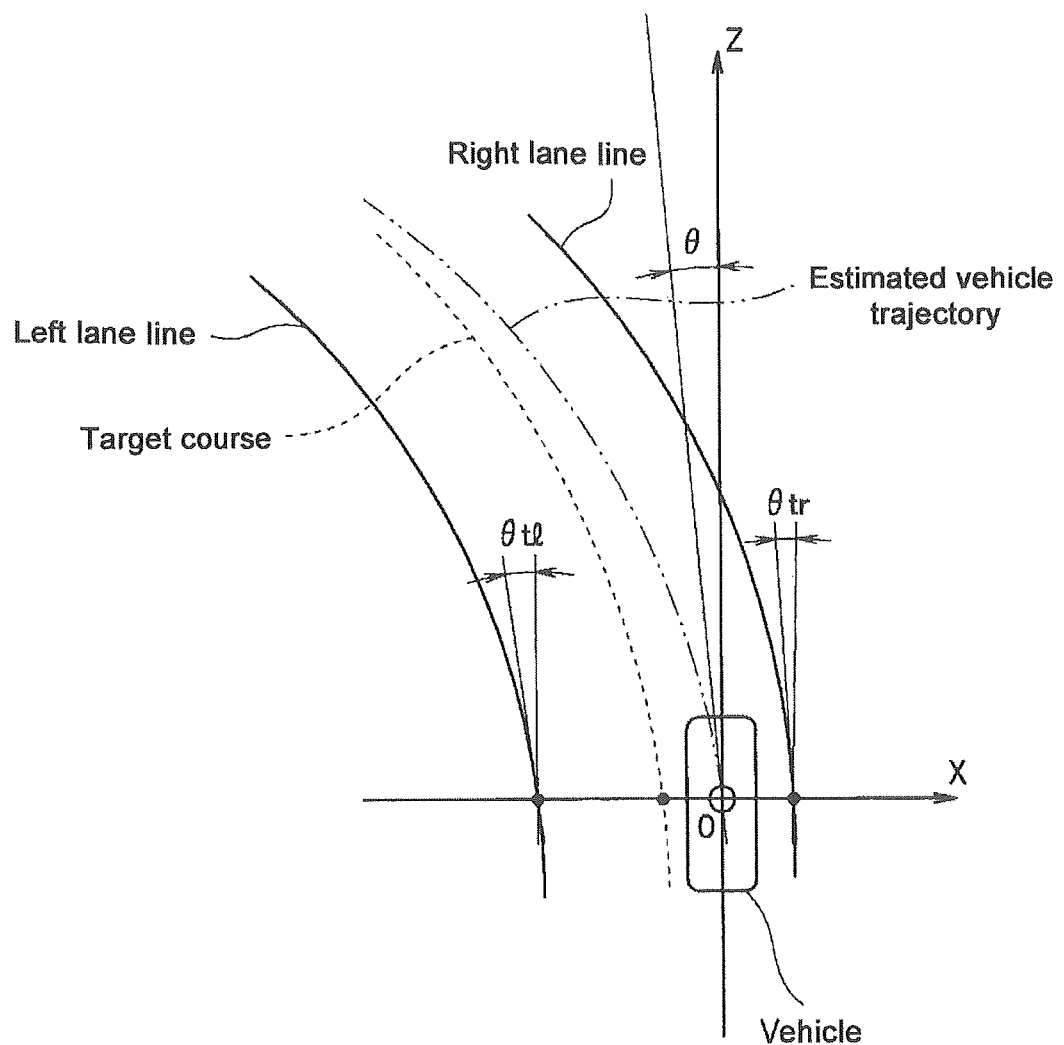
FIG. 7 is an explanatory drawing illustrating the feedback calculation term based on the yaw angle according to the implementation of the present invention.

Thus, as illustrated in FIG. 7, $\theta t_1$ is the inclination of the vehicle with respect to the left lane line determined from the image information from the forward recognition device 31, and $\theta tr$ is the inclination of the vehicle with respect to the right lane line determined from the image information from the forward recognition device 31. For example, a first-order coefficient (that is, the value of B when the lane line is approximated by the equation $x = A \cdot z^2 + B \cdot z + C$), which is calculated by the second-order least square method with respect to each point of the lane line obtained from the image information, is used for the $\theta t_1$, $\theta tr$.

Therefore, the second calculation term of Eq. (4) is for calculating the running posture (yaw angle $\theta$) of the vehicle in relation to the lane line recognized by the forward recognition device 31, as illustrated in FIG. 7.

Further, the above-mentioned Gtfb in Eq. (5) is a preset torque recalculation factor.

The feedback control amount (torque value) Tfb calculated in the above-described manner in the feedback control unit 20c is outputted to the input torque calculation unit 20d, and the feedback control amount (current value) Ifb is outputted to the electric power steering motor current value calculation unit 20f.

The input torque calculation unit 20d receives input of the steering torque Td from the steering torque sensor 34, receives input of the feed-forward control amount Tff from the feed-forward control unit 20a, and receives input of the feedback control amount Tfb from the feedback control unit 20c. Then, the input torque Tin is calculated, for example, by Eq. (9) below and the calculated input torque is outputted to the electric power steering motor basic value setting unit 20e.

$$Tin=Td+G1\cdot(Tff+Tfb) \quad (9)$$

where Gi is a preset gain.

Figure 8:
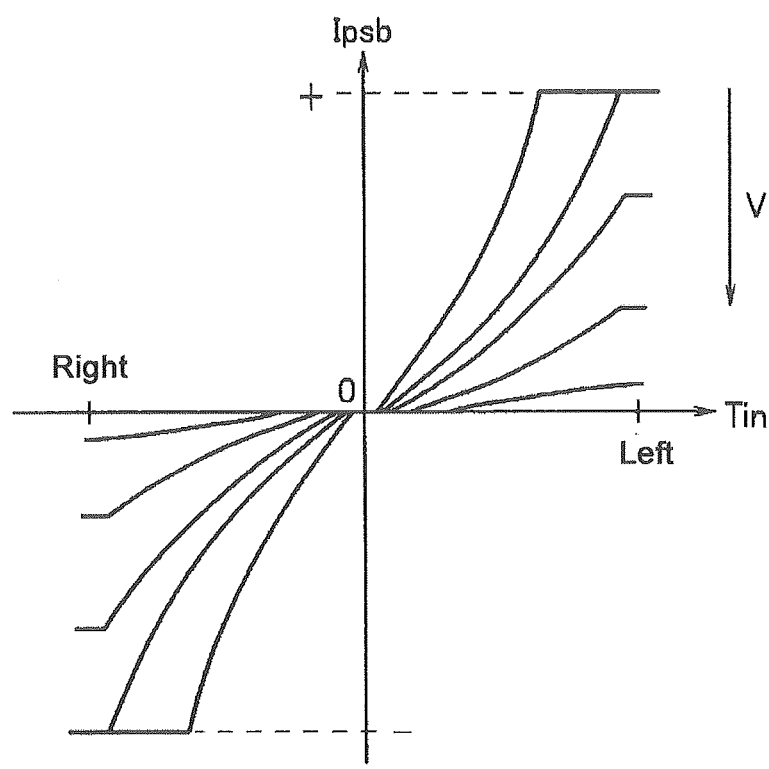
FIG. 8 is an explanatory drawing illustrating an example of an input torque-motor current value characteristic of the electric power steering motor according to the implementation of the present invention.

The electric power steering motor basic value setting unit 20e receives input of the vehicle speed V from the vehicle speed sensor 32 and receives input of the input torque Tin from the input torque calculation unit 20d. Then, for example, the electric motor basic current value Ipsb is set with reference to the preset property map of the input torque Tin—electric motor basic current value Ips, such as illustrated in FIG. 8, and the set current value is outputted to the electric power steering motor current value calculation unit 20f.

The electric power steering motor current value calculation unit 20f receives input of the feed-forward control amount Iff from the feed-forward control unit 20a, receives input of the feedback control amount Ifb from the feedback control unit 20c, and receives input of the electric motor basic current value Ipsb from the electric power steering motor basic value setting unit 20e. Then, the electric motor current value Icmd is calculated, for example, by Eq. (10) below, and outputted to the motor drive unit 21.

$$Icmd=Ipsb+Iff+Ifb \quad (10)$$

Thus, in the present implementation, the feed-forward control unit 20a and the feedback control unit 20c are configured to have the functions of a target course setting unit and a vehicle trajectory estimation unit, and the prediction time setting unit 20b and the feedback control unit 20c are configured to have the functions of a forward gaze point calculation unit and have the functions of a control unit in the steering control unit 20.

Figure 3:
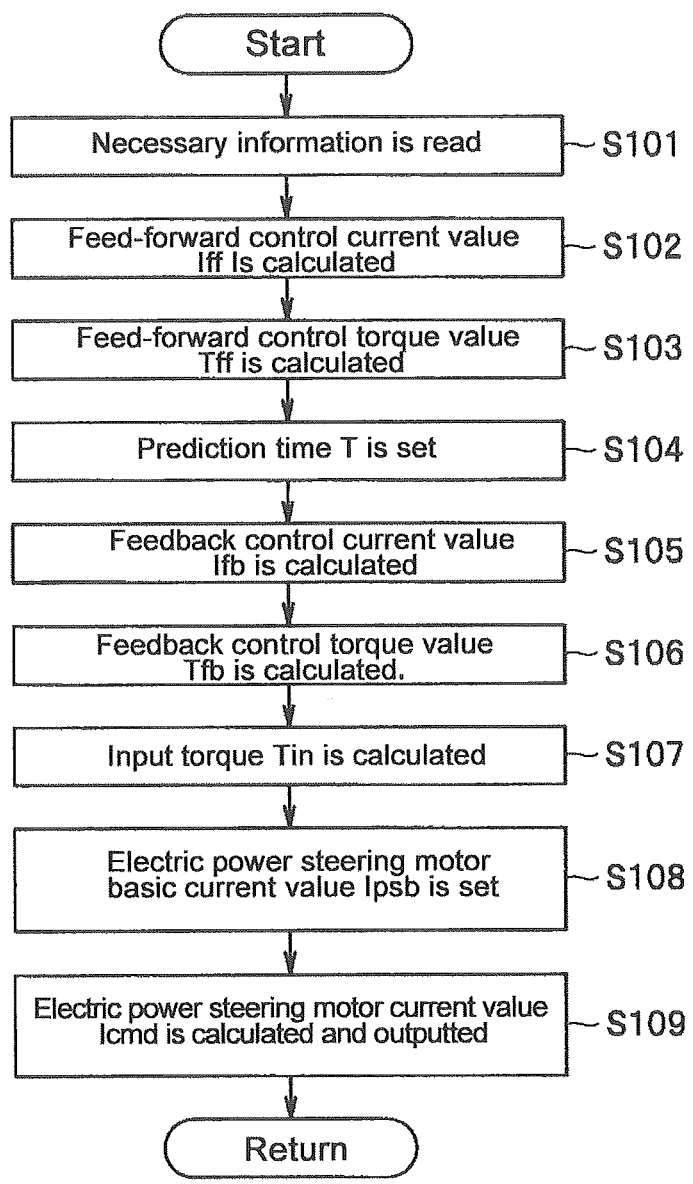
FIG. 3 illustrates the flowchart of a lane keep control program according to the implementation of the present invention.

The lane keep control executed in the above-mentioned steering control unit 20 is explained hereinbelow with the flowchart illustrated in FIG. 3.

First, in step (abbreviated hereinbelow as "S") 101, the necessary parameters, namely, the road shape, vehicle speed V, steering angle θp, and steering torque Td are read.

Then, in S102, the feed-forward control amount (current value) Iff is calculated by Eq. (1) above in the feed-forward control unit 20a.

The processing then advances to S103 and the feed-forward control amount (torque value) Tff is calculated by Eq. (2) above in the feed-forward control unit 20a.

The processing then advances to S104 and the prediction time T is set in the prediction time setting unit 20b with reference to the property map, such as illustrated in FIG. 5, which has been set in advance by tests or calculations, according to the substantially present displacement xi between the target course and the vehicle position.

The processing then advances to S105 and the feedback control amount (current value) Ifb is calculated by Eq. (4) above in the feedback control unit 20c.

The processing then advances to S106 and the feedback control amount (torque value) Tfb is calculated by Eq. (5) above in the feedback control unit 20c.

The processing then advances to S107 and the input torque Tin is calculated by Eq. (9) above in the input torque calculation unit 20d.

The processing then advances to S108 and the electric motor basic current value Ipsb is set in the electric power steering motor basic value setting unit 20e with reference to the preset property map of the input torque Tin—electric motor basic current value Ips, such as illustrated in FIG. 8.

The processing then advances to S109 and the electric motor current value Icmd is calculated in the electric power steering motor current value calculation unit 20f, for example, by Eq. (10) above, and outputted to the motor drive unit 21.

Thus, in the present implementation, the steering control unit 20 calculates the feed-forward control amounts Iff and Tff of the electric motor 12, which are necessary for the vehicle to travel along the target course under the feed-forward control, on the basis of the road shape. The prediction time T is variably set to be shorter for a larger present displacement between the target course and the vehicle position, the position after the prediction time T has elapsed is taken as a forward gaze point, and the feedback control amounts Ifb and Tfb of the electric motor 12, which are necessary for the vehicle to travel along the target course under the feedback control, are calculated on the basis of the traveling state of the vehicle such as to zero the displacement between the target course and the trajectory of the vehicle in the forward gaze point. The input torque Tin serving as a control input value is then calculated on the basis of the driver steering torque Td, feed-forward control amount Tff, and feedback control amount Tfb, and the electric motor current value Icmd serving as a control output value is calculated from the electric motor basic current value Ipsb, which is obtained on the basis of the input torque Tin, and also from the feed-forward control amount Iff and the feedback control amounts Ifb.

Thus, where the distance from the present vehicle position to the forward gaze point is small, or the prediction time T is short, the proximity of the vehicle is viewed, the operation allowing the vehicle to track rapidly the target course is performed, and the target course tracking ability is improved, but nervous and unstable target steering angle or vehicle behavior focused only on the present transverse deviation is realized. For example, as illustrated by a dot-dash line in FIG. 9A, when the lane keep control is ON at a time t0 at a present position (initial position) L1 which is at a distance from the target course, the vehicle can reach the target course at the earliest time t1, but the distance from the target course then increases, and the largest deviation from the target course is reached at a time t4, which results in the degraded convergence ability.

Meanwhile, where the prediction time T is extended, the operation that may return the vehicle to the target course after the prediction time is performed and the target course tracking ability is slowed down, but the prediction control is performed that takes into account not only the transverse deviation from the target course, but also the orientation of the vehicle with respect to the target course, and the change ratio thereof (yaw rate), and stable target steering angle and vehicle behavior are obtained. For example, as illustrated by the broken line in FIG. 9A, the deviation from the target course decreases, and the improved convergence to the target course can be expected, but the time t3 to reach the target course is the longest.

Figure 9A:
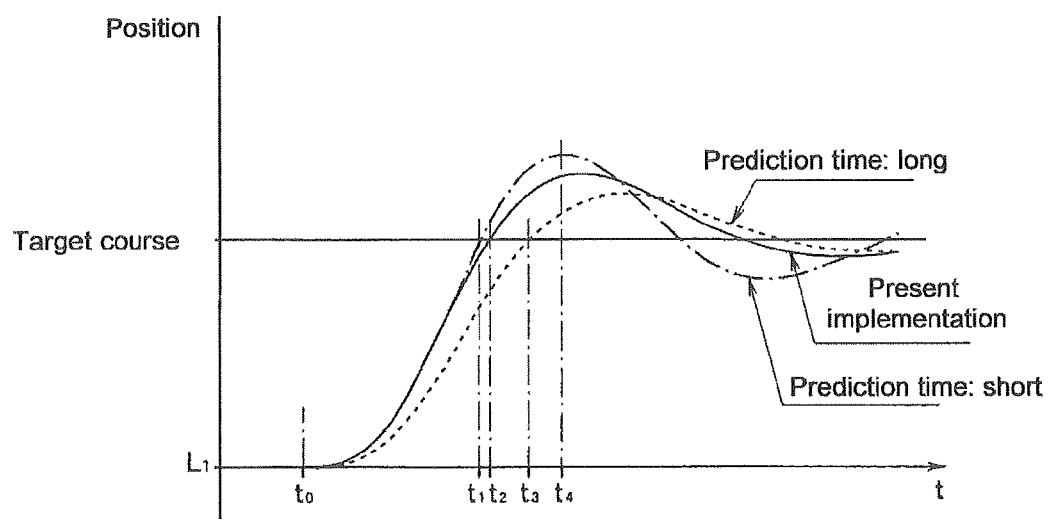
Figure 9B:
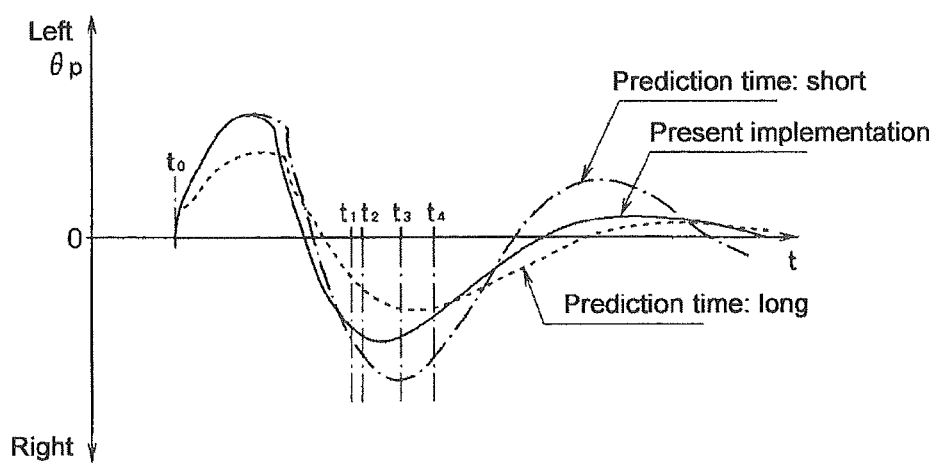

Therefore, where the absolute value |xi| of the substantially present displacement between the target course and the vehicle position is large, the control prioritizing the target course tracking ability is performed, and when the absolute value |xi| of the displacement is small, the ability to track rapidly the target course and the stability of vehicle behavior on the target course are effectively balanced so as to enable the prediction control emphasizing the stability and convergence and taking into account also the orientation of the vehicle with respect to the target course and the change ratio thereof (yaw rate) (see the solid line in FIG. 9A).

In the present implementation, the control is conducted in which not only an electric current is added to the electric motor basic current value Ipsb, but also the above-described torque addition is performed with respect to the input torque Tin when the electric motor basic current value Ipsb is determined, but it is also possible to conduct the control in which only an electric current is added to the electric motor basic current value Ipsb, or the control in which only the above-described torque addition is performed with respect to the input torque Tin.

The invention claimed is:

1. A driving assist controller for a vehicle, comprising:
   a target course specifying unit configured to specify a target course along which a vehicle equipped with the driving assist controller is to travel using input signals from at least a camera;
   a vehicle trajectory specifying unit configured to specify a trajectory of the vehicle;
   a forward gaze point specifying unit configured to specify a position after an elapse of a prediction time, which is variably set according to a present displacement between the target course and the vehicle position, as a forward gaze point; and
   a controller configured to control the vehicle such that the vehicle travels along the target course in response at least to a displacement between the target course in the forward gaze point and the estimated trajectory of the vehicle,
   wherein the forward gaze point specifying unit dynamically specifies the prediction time based on at least two pre-determined vehicle conditions.

2. The driving assist controller for a vehicle according to claim 1, wherein the forward gaze point specifying unit specifies the prediction time to be shorter as the substantially present displacement between the target course and the vehicle position becomes larger.

3. The driving assist controller for a vehicle according to claim 1, wherein the forward gaze point specifying unit specifies the prediction time to be shorter as a lane width of a travel lane becomes narrower.

4. The driving assist controller for a vehicle according to claim 2, wherein the forward gaze point specifying unit specifies the prediction time to be shorter as a lane width of a travel lane becomes narrower.

5. The driving assist controller for a vehicle according to claim 1, wherein the forward gaze point specifying unit specifies the prediction time to be shorter as a curve radius of a travel lane becomes smaller.

6. The driving assist controller for a vehicle according to claim 2, wherein the forward gaze point specifying unit specifies the prediction time to be shorter as a curve radius of a travel lane becomes smaller.

7. The driving assist controller for a vehicle according to claim 3, wherein the forward gaze point specifying unit specifies the prediction time to be shorter as a curve radius of a travel lane becomes smaller.

8. The driving assist controller for a vehicle according to claim 4, wherein the forward gaze point specifying unit specifies the prediction time to be shorter as a curve radius of a travel lane becomes smaller.

9. The driving assist controller for a vehicle according to claim 1, wherein the forward gaze point specifying unit specifies the prediction time to be shorter when an oncoming vehicle is present in a travel lane.

10. The driving assist controller for a vehicle according to claim 2, wherein the forward gaze point specifying unit specifies the prediction time to be shorter when an oncoming vehicle is present in a travel lane.

11. The driving assist controller for a vehicle according to claim 3, wherein the forward gaze point specifying unit specifies the prediction time to be shorter when an oncoming vehicle is present in a travel lane.

12. The driving assist controller for a vehicle according to claim 4, wherein the forward gaze point specifying unit specifies the prediction time to be shorter when an oncoming vehicle is present in a travel lane.

13. The driving assist controller for a vehicle according to claim 1, wherein the controller controls an electric power steering motor.

14. The driving assist controller for a vehicle according to claim 2, wherein the controller controls an electric power steering motor.

15. The driving assist controller for a vehicle according to claim 3, wherein the controller controls an electric power steering motor.

16. The driving assist controller for a vehicle according to claim 4, wherein the controller controls an electric power steering motor.

17. The driving assist controller for a vehicle according to claim 1, wherein the pre-determined condition comprises at least one of a substantially present displacement between the target course and the vehicle position becoming larger, a lane width of a travel lane becoming narrower, a curve radius of a travel lane becoming smaller, and an oncoming vehicle being present in a travel lane.

18. The driving assist controller for a vehicle according to claim 1, wherein the controller controls a feedback control on the basis of the travel state of the vehicle so as to zero the displacement between the target course in the forward gaze point and the estimated trajectory of the vehicle.

* * * * *